US012451083B2

(12) United States Patent
Lee et al.

(10) Patent No.: US 12,451,083 B2
(45) Date of Patent: Oct. 21, 2025

(54) ELECTRONIC DEVICE AND CONTROL METHOD THEREOF

(71) Applicant: Samsung Electronics Co., Ltd., Suwon-si (KR)

(72) Inventors: Minwoo Lee, Suwon-si (KR); Seoyoung Lee, Suwon-si (KR); Juseok Lee, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 18/344,020

(22) Filed: Jun. 29, 2023

(65) Prior Publication Data

US 2023/0343299 A1 Oct. 26, 2023

Related U.S. Application Data

(63) Continuation of application No. PCT/KR2021/018955, filed on Dec. 14, 2021.

(30) Foreign Application Priority Data

Feb. 5, 2021 (KR) ........................ 10-2021-0016792

(51) Int. Cl.
*G09G 3/3275* (2016.01)
*G09G 5/395* (2006.01)

(52) U.S. Cl.
CPC ....... *G09G 3/3275* (2013.01); *G09G 2360/08* (2013.01); *G09G 2360/18* (2013.01)

(58) Field of Classification Search
CPC .. G09G 5/00; G09G 5/12; G09G 5/18; G09G 5/39; G09G 5/393; G09G 5/395;
(Continued)

(56) References Cited

U.S. PATENT DOCUMENTS 7,324,114 B2 1/2008 Mutanen et al.
9,472,133 B2 10/2016 Kim et al.
(Continued)

FOREIGN PATENT DOCUMENTS

KR 100751861 B1 8/2007
KR 20130070765 A 6/2013
(Continued)

OTHER PUBLICATIONS

International Search Report for PCT/KR2021/018955 mailed Apr. 6, 2022, 4 pages.

(Continued)

*Primary Examiner* — Chanh D Nguyen
*Assistant Examiner* — Nguyen H Truong
(74) *Attorney, Agent, or Firm* — Nixon & Vanderhye, P.C.

(57) ABSTRACT

An example electronic device includes a display panel configured to display a screen, a display driver IC (DDI) configured to supply a data voltage for displaying the screen to the display panel, and a processor configured to transmit image data for setting the data voltage to the DDI. The DDI is configured to generate a synchronization signal for controlling a time point at which the data voltage is supplied to the display panel, and to deliver the synchronization signal to the processor. The processor is configured to select a time point, at which the image data starts to be transmitted, within a waiting period of the synchronization signal.

16 Claims, 9 Drawing Sheets

(58) Field of Classification Search
CPC .. G09G 3/20; G09G 3/32; G09G 3/34; G09G 3/36; G09G 3/3275; G09G 3/3208; G09G 3/3233; G09G 3/3225; G09G 3/3291; G09G 3/3266; G09G 3/3258; G06T 1/00; G06T 1/20; G06T 1/60; G06T 9/00; H04N 3/27; H04N 5/232
See application file for complete search history.

(56) References Cited

U.S. PATENT DOCUMENTS

| | | | |
|---|---|---|---|
| 9,514,511 | B2 | 12/2016 | Lee et al. |
| 9,905,193 | B2 | 2/2018 | Oh et al. |
| 10,019,968 | B2 | 7/2018 | Bi et al. |
| 10,068,555 | B2 | 9/2018 | Kim et al. |
| 10,096,303 | B2 | 10/2018 | Lee et al. |
| 10,438,526 | B2 | 10/2019 | Kim et al. |
| 10,636,362 | B2 | 4/2020 | Koo et al. |
| 10,762,870 | B2 | 9/2020 | Han et al. |
| 10,789,911 | B2 | 9/2020 | Liu et al. |
| 2004/0239677 | A1 | 12/2004 | Mutanen et al. |
| 2013/0155036 | A1 | 6/2013 | Kim et al. |
| 2015/0015591 | A1 | 1/2015 | Oh et al. |
| 2015/0130824 | A1 | 5/2015 | Lee et al. |
| 2016/0055830 | A1 | 2/2016 | Lee et al. |
| 2016/0343355 | A1 | 11/2016 | Kim et al. |
| 2017/0025055 | A1 | 1/2017 | Kim et al. |
| 2017/0193971 | A1* | 7/2017 | Bi ............................ G09G 5/18 |
| 2019/0311680 | A1 | 10/2019 | Koo et al. |
| 2020/0066226 | A1 | 2/2020 | Han et al. |
| 2020/0184929 | A1 | 6/2020 | Liu et al. |
| 2021/0350771 | A1* | 11/2021 | Choi .................... G09G 3/3611 |
| 2021/0407456 | A1* | 12/2021 | Hussain .................... G06T 1/20 |
| 2023/0290298 | A1* | 9/2023 | Gao ....................... G09G 5/395 |

FOREIGN PATENT DOCUMENTS

| | | | |
|---|---|---|---|
| KR | 20150007948 | A | 1/2015 |
| KR | 20150055324 | A | 5/2015 |
| KR | 20160024278 | A | 3/2016 |
| KR | 20160135993 | A | 11/2016 |
| KR | 10-2018-0036142 | | 4/2018 |
| KR | 20180131705 | A | 12/2018 |
| KR | 20200024383 | A | 3/2020 |
| KR | 20200033084 | A | 3/2020 |

OTHER PUBLICATIONS

Written Opinion of the ISA for PCT/KR2021/018955 mailed Apr. 6, 2022, 5 pages.

Office Action dated Sep. 24, 2024 in Korean Patent Application No. 10-2021-0016792 and English-language translation.

Office Action dated Apr. 14, 2025 in Korean Patent Application No. 10-2021-0016792 and English-language translation.

* cited by examiner

ELECTRONIC DEVICE AND CONTROL METHOD THEREOF

CROSS-REFERENCE TO RELATED APPLICATIONS

This application is a continuation of International Application No. PCT/KR2021/018955 designating the United States, filed on Dec. 14, 2021, in the Korean Intellectual Property Receiving Office and claiming priority to Korean Patent Application No. 10-2021-0016792, filed on Feb. 5, 2021, in the Korean Intellectual Property Office, the disclosures of each of which are incorporated by reference herein in their entireties.

BACKGROUND

Field

The disclosure relates to an electronic device and a control method thereof.

Description of Related Art

An electronic device may display a screen on a display panel depending on the driving of a display driver IC (DDI). During one frame period set depending on an operating frequency, the electronic device may display a screen corresponding to image data of the corresponding frame. The frame period may include a display period, in which a screen is displayed on the display, and a waiting period in which image data is delivered from a processor to the DDI to display the screen on the display.

The DDI may store image data delivered by the processor in a frame buffer. During one frame period, the DDI may scan a data voltage, which is set based on the image data stored in the buffer, to the display panel. The DDI may transmit a synchronization signal to the processor so as to determine a point in time when the processor starts delivering the image data.

SUMMARY

At a rising time point when a received synchronization signal changes to a high (H) state, a processor may be configured to deliver image data. While the synchronization signal is high, a DDI may start scanning a data voltage to a display panel. A current frame may be maintained until a point in time when image data of the next frame is input.

When the point in time when image data of the next frame is input is delayed, the waiting period of the current frame may increase. A length of the current frame may be changed depending on the point in time when the image data of the next frame is input. In a case of an organic light emitting diode-typed display, pixel characteristic values related to light emission of pixels may be set depending on the length of a frame. When the length of the current frame is changed depending on a point in time when the image data of the next frame is input, it may not be easy to set pixel characteristic values to correspond to the length of the current frame. Accordingly, a change in operating frequency of an organic light emitting diode-type display may be detected.

Moreover, when image data of a frame fails to be delivered at a point in time when a synchronization signal is in a high state, image data may be delivered at a point in time when the synchronization signal of the next frame, not the corresponding frame, is in a high state. Accordingly, the image data fails to be delivered during the corresponding frame, and thus a frame drop phenomenon that a screen corresponding to image data of the previous frame is maintained may occur. When the frame drop phenomenon occurs, the screen stops during the corresponding frame, and thus a user may unnaturally feel the movement of the screen.

Various embodiments of the disclosure may provide an electronic device that is capable of variably setting an operating frequency of an organic light emitting diode-type display by setting pixel characteristic values to correspond to the length of a frame, and reducing a frame drop phenomenon, and a control method of the electronic device.

According an example embodiment, an electronic device may include a display panel that displays a screen, a display driver IC (DDI) that supplies a data voltage for displaying the screen to the display panel, and a processor configured to transmit image data for setting the data voltage to the DDI. The DDI may be configured to generate a synchronization signal for controlling a time point at which the data voltage is supplied to the display panel, and to deliver the synchronization signal to the processor. The processor may be configured to select a time point, at which the image data starts to be transmitted, within a waiting period of the synchronization signal.

Moreover, according an example embodiment, a method for controlling an electronic device may include generating, by a DDI of the electronic device, a synchronization signal for controlling a time point at which a data voltage is supplied to a display panel of the electronic device, delivering, by the DDI, the synchronization signal to a processor of the electronic device, and selecting, by the processor, a time point, at which the image data starts to be transmitted to the DDI, within a waiting period of the synchronization signal.

Furthermore, according an example embodiment, a non-transitory computer-readable recording medium stores a plurality of instructions. The plurality of instructions may cause a DDI of an electronic device to generate a synchronization signal for controlling a time point at which a data voltage is supplied to a display panel of the electronic device, may allow the DDI to deliver the synchronization signal to a processor of the electronic device, and may allow the processor to select a time point, at which the image data starts to be transmitted to the DDI, within a waiting period of the synchronization signal.

According to the example embodiments, because a length of a current frame does not change depending on a time point at which image data of the next frame is transmitted, the length of a frame may be identified at the start of the frame. Accordingly, because pixel characteristic values are set to correspond to the length of the frame, the operating frequency of an organic light emitting diode-type display may be variably adjusted.

Moreover, according to the example embodiments, image data may be transmitted when a synchronization signal of the frame is in a high state. Accordingly, a frame drop phenomenon may be reduced by transmitting image data without waiting until a rising time point of the next synchronization signal.

In addition, a variety of effects directly or indirectly understood through the specification may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components will be identified by the same or similar reference signs.

DETAILED DESCRIPTION

Hereinafter, various embodiments of the disclosure will be described with reference to accompanying drawings. However, those of ordinary skill in the art will recognize that modifications, equivalents, and/or alternatives on various embodiments described herein can be variously made without departing from the scope and spirit of the disclosure.

Figure 1:
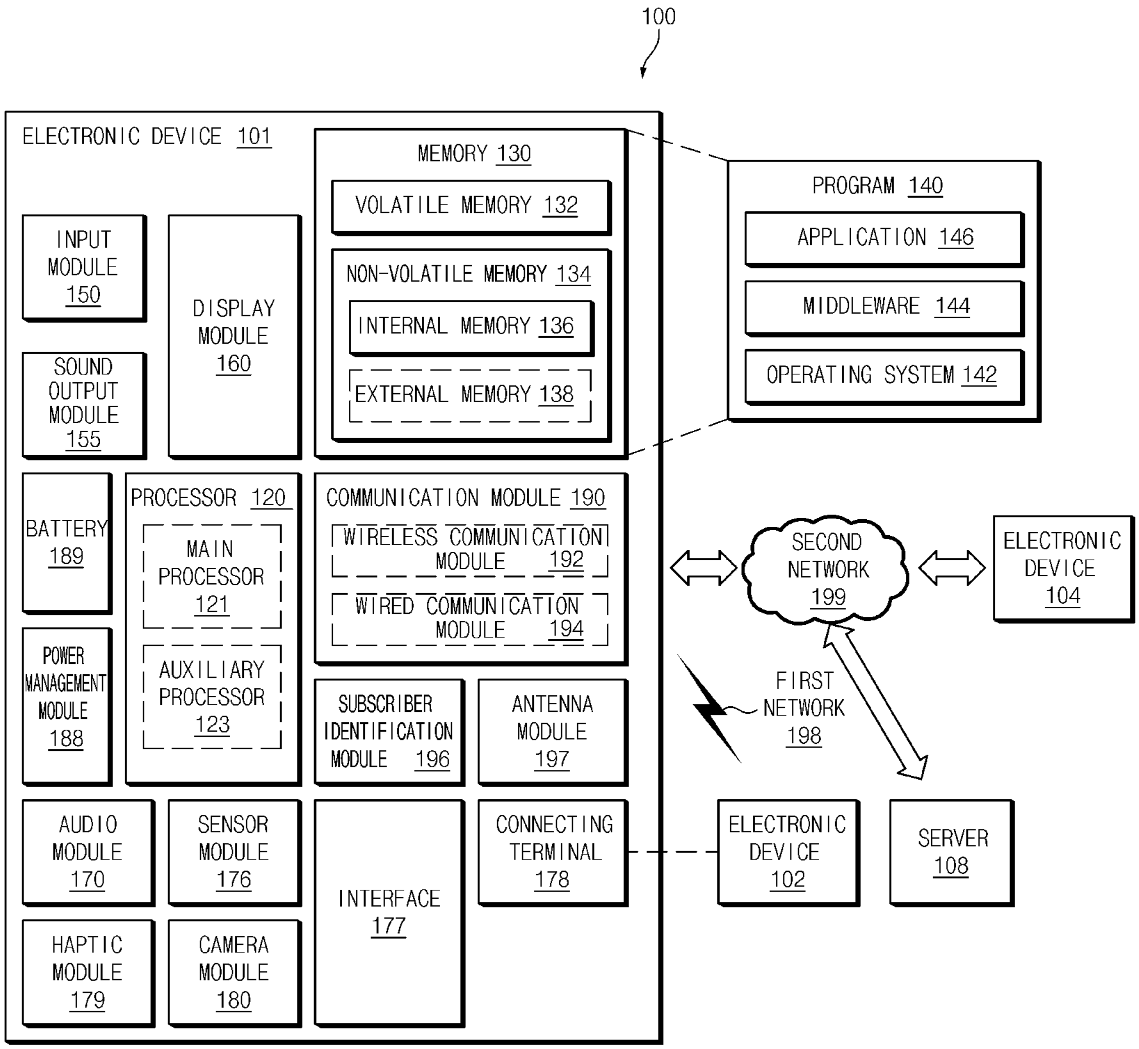
FIG. 1 is a block diagram of an example electronic device in a network environment, according to various embodiments.

FIG. 1 is a block diagram of an example electronic device 101 in a network environment 100, according to various embodiments. Referring to FIG. 1, the electronic device 101 in the network environment 100 may communicate with an electronic device 102 over a first network 198 (e.g., a short range wireless communication network) or may communicate with an electronic device 104 or a server 108 over a second network 199 (e.g., a long distance wireless communication network). The electronic device 101 may communicate with the electronic device 104 through the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module 196, or an antenna module 197. In any embodiment, the electronic device 101 may not include at least one (e.g., the connecting terminal 178) of the above-described components or may further include one or more other components. In various embodiments, some (e.g., the sensor module 176, the camera module 180, or the antenna module 197) of these components may be integrated into a single component (e.g., the display module 160).

For example, the processor 120 may execute software (e.g., a program 140) to control at least another component (e.g., hardware or software component) of the electronic device 101 connected to the processor 120, and may process and calculate various types of data. According to an embodiment, as at least part of data processing or calculation, the processor 120 may store instructions or data received from other components (e.g., the sensor module 176 or the communication module 190) into a volatile memory 132, may process instructions or data stored in the volatile memory 132, and may store the result data in a nonvolatile memory 134. According to an embodiment, the processor 120 may include a main processor 121 (e.g., a central processing unit or an application processor) and an auxiliary processor 123 (e.g., a graphic processing unit, a neural processing unit (NPU), an image signal processor, a sensor hub processor, or a communication processor) capable of operating independently or together with the main processor. For example, when the electronic device 101 includes the main processor 121 and the auxiliary processor 123, the auxiliary processor 123 may be configured to use less power than the main processor 121 or to be specialized for a specified function. The auxiliary processor 123 may be implemented separately from the main processor 121 or as part of the main processor 121.

For example, the auxiliary processor 123 may control at least part of the functions or states associated with at least one (e.g., the display module 160, the sensor module 176, or the communication module 190) of the components of the electronic device 101, instead of the main processor 121 while the main processor 121 is in an inactive (e.g., sleep) state or together with the main processor 121 while the main processor 121 is in an active (e.g., the execution of an application) state. According to an embodiment, the auxiliary processor 123 (e.g., an image signal processor or a communication processor) may be implemented as a part of operatively associated other components (e.g., the camera module 180 or the communication module 190). According to an embodiment, the auxiliary processor 123 (e.g., a neural network processing unit) may include a hardware structure specialized to process an artificial intelligence model. The artificial intelligence model may be generated through machine learning. For example, the learning may be performed in the electronic device 101, in which an artificial intelligence program is performed, or may be performed through a separate server (e.g., server 108). For example, the learning algorithm may include supervised learning, unsupervised learning, semi-supervised learning, or reinforcement learning, but may not be limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above-described networks, but may not be limited to the above-described examples. In addition to a hardware structure, additionally or alternatively, the artificial intelligence model may include a software structure.

The memory 130 may store various pieces of data used by at least one component (e.g., the processor 120 or the sensor module 176) of the electronic device 101. For example, data may include software (e.g., the program 140) and input data or output data for instructions associated with the software. The memory 130 may include, for example, the volatile memory 132 or the nonvolatile memory 134.

The program 140 may be stored as software in the memory 130 and may include, for example, an operating system 142, a middleware 144, or an application 146.

The input module 150 may receive instructions or data to be used for the component (e.g., the processor 120) of electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for a general purpose, such as multimedia play or recording play. The receiver may be used to receive an incoming call. According to an embodiment, the receiver may be implemented separately from the speaker or may be implemented as a part of the speaker.

The display module 160 may visually provide information to the outside (e.g., the user) of the electronic device 101. The display module 160 may include, for example, a display, a hologram device, or a control circuit for controlling a projector and a corresponding device. According to an embodiment, the display module 160 may include a touch sensor configured to sense a touch, or a pressure sensor configured to measure the strength of force generated by the touch.

The audio module 170 may convert sound to an electrical signal, or reversely, may convert an electrical signal to sound. According to an embodiment, the audio module 170 may obtain sound through the input module 150, or may output sound through the sound output module 155, or through an external electronic device (e.g., the electronic device 102) (e.g., a speaker or a headphone) directly or wirelessly connected with the electronic device 101.

The sensor module 176 may sense an operation state (e.g., power or a temperature) of the electronic device 101 or an external environment state (e.g., a user state), and may generate an electrical signal or a data value corresponding the sensed state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 101 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

The connecting terminal 178 may include a connector that may allow the electronic device 101 to be physically connected with an external electronic device (e.g., the electronic device 102). According to an embodiment, the connecting terminal 178 may include, for example, a HDMI connector, an USB connector, an SD card connector, or an audio connector (e.g., a headphone connector).

The haptic module 179 may convert an electrical signal to a mechanical stimulation (e.g., vibration or movement) or an electrical stimulation which the user may perceive through the sense of touch or the sense of movement. According to an embodiment, the haptic module 179 may include, for example, a motor, a piezoelectric sensor, or an electrical stimulation device.

The camera module 180 may shoot a still image or a video image. According to an embodiment, the camera module 180 may include one or more lenses, image sensors, image signal processors, or flashes (or electrical flashes).

The power management module 188 may manage the power which is supplied to the electronic device 101. According to an embodiment, the power management module 188 may be implemented, for example, as at least part of a power management integrated circuit (PMIC).

The battery 189 may power at least one component of the electronic device 101. According to an embodiment, the battery 189 may include, for example, a primary cell not rechargeable, a secondary cell rechargeable, or a fuel cell.

The communication module 190 may establish a direct (or wired) communication channel or a wireless communication channel between the electronic device 101 and an external electronic device (e.g., the electronic device 102, the electronic device 104, or the server 108) and may perform communication through the established communication channel. The communication module 190 may include one or more communication processors which are operated independently of the processor 120 (e.g., an application processor) and support direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). The corresponding communication module among these communication modules may communicate with an external electronic device 104 through the first network 198 (e.g., a short-range communication network such as Bluetooth, wireless fidelity (WiFi) direct or infrared data association (IrDA)) or the second network 199 (e.g., a legacy cellular network, 5G networks, next-generation communication networks, Internet, or telecommunication networks such as computer networks (e.g., LAN or WAN)) included in a network. The above-described kinds of communication modules may be integrated in one component (e.g., a single chip) or may be implemented with a plurality of components (e.g., a plurality of chips) which are independent of each other. The wireless communication module 192 may identify or authenticate the electronic device 101 within a communication network, such as the first network 198 or the second network 199, by using subscriber information (e.g., international mobile subscriber identity (IMSI)) stored in the subscriber identification module 196.

The wireless communication module 192 may support a 5G network and a next-generation communication technology after a 4G network, for example, a new radio (NR) access technology. The NR access technology may support enhanced mobile broadband (eMBB), massive machine type communications (mMTC), or ultra-reliable and low-latency communications (URLLC). For example, the wireless communication module 192 may support a high frequency band (e.g., mmWave band) to achieve a high data transfer rate. The wireless communication module 192 may support various technologies for securing performance in a high frequency band, for example, technologies such as beamforming, massive multiple-input and multiple-output (massive MIMO), full dimensional MIMO (FD-MIMO), an array antenna, analog beam-forming, and a large scale antenna. The wireless communication module 192 may support various requirements regulated in the electronic device 101, an external electronic device (e.g., the electronic device 104) or a network system (e.g., the second network 199). According to an embodiment, the wireless communication module 192 may support peak data rate (e.g., 20 Gbps or more) for eMBB implementation, loss coverage (e.g., 164 dB or less) for mMTC implementation, or U-plane latency (e.g., downlink (DL) of 0.5 ms or less and uplink (UL) of 0.5 ms or less, or round trip of 1 ms or less) for URLLC implementation.

The antenna module 197 may transmit a signal or a power to the outside (e.g., an external electronic device) or may receive a signal or a power from the outside. According to an embodiment, the antenna module 197 may include an antenna including a radiator formed of or including a conductor or a conductive pattern formed on a substrate (e.g., PCB). According to an embodiment, the antenna module 197 may include a plurality of antennas (e.g., an array antenna). In this case, at least one antenna suitable for a communication scheme used in a communication network such as the first network 198 or the second network 199 may be selected, for example, by the communication module 190 from the plurality of antennas. The signal or power may be exchanged between the communication module 190 and an external electronic device through the selected at least one antenna or may be received from the external electronic device through the selected at least one antenna and the communication module 190. According to various embodiments, other parts (e.g., radio frequency integrated circuit (RFIC)) may be additionally formed as a part of the antenna module 197 in addition to the radiator.

According to various embodiments, the antenna module 197 may form an mmWave antenna module. According to an embodiment, the mmWave antenna module may include a printed circuit board (PCB), a radio frequency integrated circuit (RFIC), and a plurality of antennas (e.g., an array antenna). The RFIC may be disposed on or adjacent to a first surface (e.g., a bottom surface) of the PCB and may support a specified high frequency band (e.g., mmWave band). The plurality of antennas may be disposed on or adjacent to a second surface (e.g., a top surface or a side surface) of the PCB and may transmit or receive a signal in the specified high frequency band.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 101 and the external electronic device 104 through the server 108 connected to the second network 199. Each of the external electronic device 102 or 104 may be a device of which the type is the same as or different from that of the electronic device 101. According to an embodiment, all or a part of operations to be executed by the electronic device 101 may be executed in one or more external electronic devices among the external electronic devices 102, 104, or 108. For example, when the electronic device 101 should perform any function or service automatically or in response to a request from the user or any other device, the electronic device 101 may additionally request one or more external electronic devices to perform at least part of the function or service, instead of internally executing the function or service. The one or more external electronic devices which receive the request may execute at least a part of the function or service thus requested or an additional function or service associated with the request, and may provide a result of the execution to the electronic device 101. The electronic device 101 may process received result as it is or additionally, and may provide a result of the processing as at least a part of the response to the request. To this end, for example, cloud computing, distributed computing, mobile edge computing (MEC), or client-server computing may be used. For example, the electronic device 101 may provide an ultra-low latency service by using distributed computing or mobile edge computing. In an embodiment, the external electronic device 104 may include an Internet of Things (IoT) device. The server 108 may be an intelligence server using machine learning and/or a neural network. According to an embodiment, the external electronic device 104 or the server 108 may be included in the second network 199. The electronic device 101 may be applied to an intelligence service (e.g., a smart home, a smart city, a smart car, or a healthcare) based on 5G communication technology and IoT-related technology.

Figure 2:
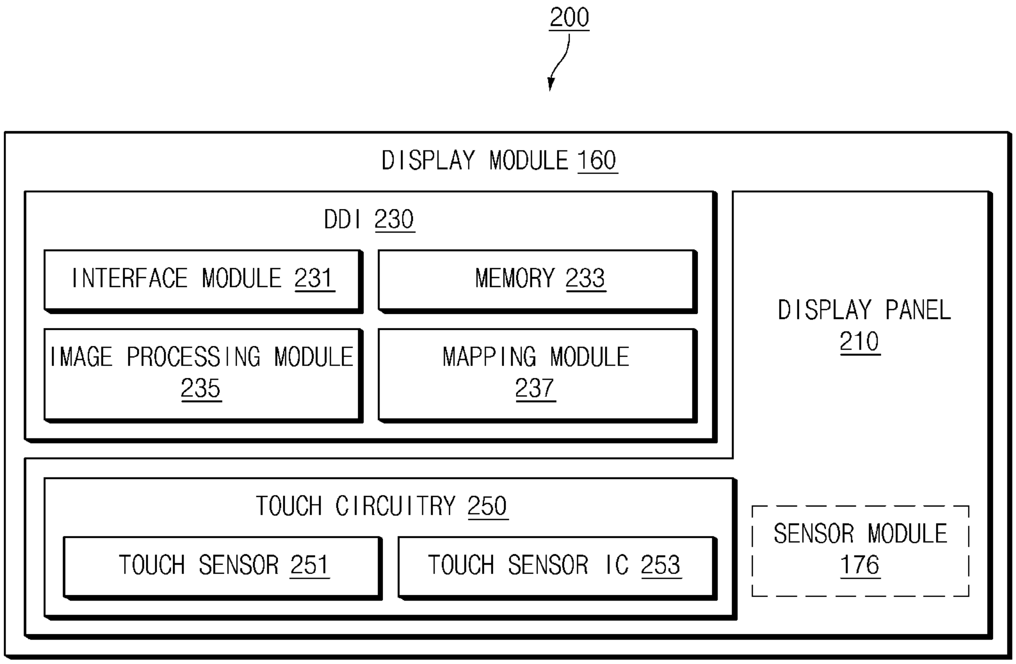
FIG. 2 is a block diagram of an example display module, according to various embodiments.

FIG. 2 is a block diagram 200 of the display module 160, according to various embodiments. Referring to FIG. 2, the display module 160 may include a display panel 210 and a display driver IC (DDI) 230 for controlling the display panel 210. The DDI 230 may include an interface module 231, a memory 233 (e.g., a buffer memory), an image processing module 235, or a mapping module 237. For example, the DDI 230 may receive image information including image data or an image control signal corresponding to a command for controlling the image data from another component of an electronic device 101 through the interface module 231. For example, according to an embodiment, the image information may be received from the processor 120 (e.g., the main processor 121) (e.g., an application processor) or the auxiliary processor 123 (e.g., a graphic processing display) that operates independently of the function of the main processor 121. The DDI 230 may communicate with a touch circuit 250, the sensor module 176, or the like through the interface module 231. In addition, the DDI 230 may store at least part of the received image information in the memory 233, for example, in units of frames. For example, the image processing module 235 may perform pre-processing or post-processing (e.g., adjustment of resolution, brightness, or size) on at least part of the image data based at least on characteristics of the image data or the display panel 210. The mapping module 237 may generate a voltage value or a current value corresponding to the image data that is pre-processed or post-processed through the image processing module 235. According to an embodiment, for example, the voltage value or the current value may be generated based at least partly on attributes (e.g., an array of pixels (RGB stripe or pentile structure) or a size of each of sub-pixels) of the display panel 210. For example, at least some pixels of the display panel 210 may be driven based at least partly on the voltage or current value, such that visual information (e.g., a text, an image, or an icon) corresponding to the image data is capable of being displayed through the display panel 210.

According to an embodiment, the display module 160 may further include the touch circuit 250. The touch circuit 250 may include a touch sensor 251 and a touch sensor IC 253 for controlling the touch sensor 251. For example, the touch sensor IC 253 may control the touch sensor 251 to sense a touch input or a hovering input at a specific location of the display panel 210. For example, the touch sensor IC 253 may measure a change in a signal (e.g., a voltage, a light amount, a resistance, or a charge amount) at a specific location of the display panel 210 to sense the touch input or the hovering input. The touch sensor IC 253 may provide the processor 120 with information (e.g., a location, an area, a pressure or a time) about the sensed touch input or hovering input. According to an embodiment, at least part (e.g., the touch sensor IC 253) of the touch circuit 250 may be included as a part of the DDI 230 or the display panel 210, or as a part of another component (e.g., the auxiliary processor 123) arranged outside the display module 160.

According to an embodiment, the display module 160 may further include at least one sensor (e.g., a fingerprint sensor, an iris sensor, a pressure sensor or an illuminance sensor) of the sensor module 176, or a control circuit thereof. In this case, the at least one sensor or the control circuit thereof may be embedded in a part (e.g., the display panel 210 or the DDI 230) of the display module 160 or in a part of the touch circuit 250. For example, when the sensor module 176 embedded in the display module 160 includes a biometric sensor (e.g., a fingerprint sensor), the biometric sensor may obtain biometric information (e.g., a fingerprint image) associated with a touch input through the partial area of the display panel 210. For another example, when the sensor module 176 embedded in the display module 160 includes a pressure sensor, the pressure sensor may obtain pressure information associated with a touch input through the partial area or the whole area of the display panel 210. According to an embodiment, the touch sensor 251 or the sensor module 176 may be interposed between pixels of the pixel layer of the display panel 210 or may be disposed above or below the pixel layer.

Figure 3:
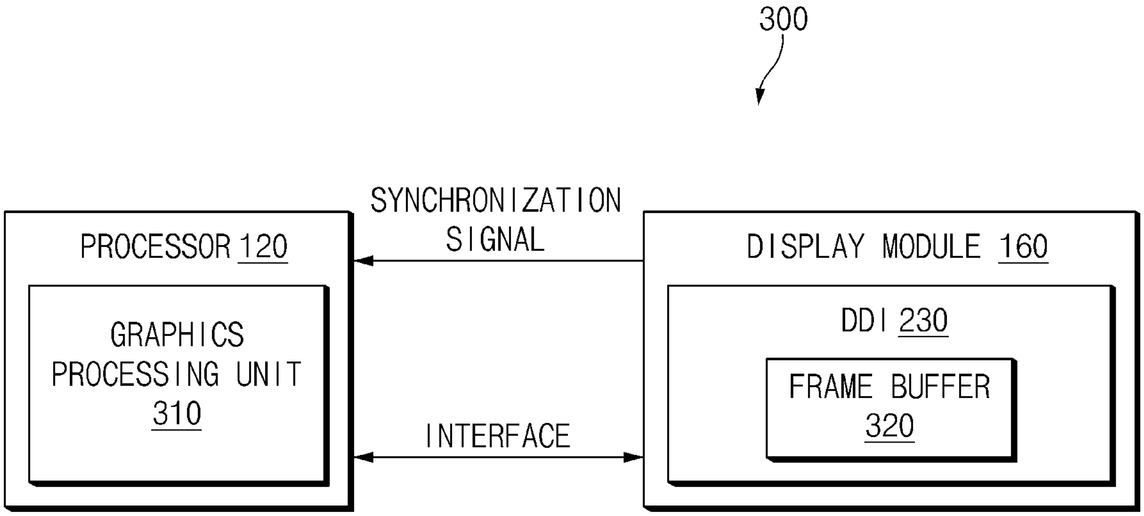
FIG. 3 is a block diagram illustrating a processor and a display module, according to various embodiments.

FIG. 3 is a block diagram 300 illustrating the processor 120 and the display module 160, according to various embodiments.

In an embodiment, the processor 120 may include a graphics processing unit 310. The graphics processing unit 310 may generate image data. The image data may define a screen output on a display panel (e.g., the display panel 210 in FIG. 2). The graphics processing unit 310 may provide the image data to an application processor (AP) included in the processor 120.

In an embodiment, the processor 120 may transmit the image data for setting a data voltage to the DDI 230. The DDI 230 may set the data voltage to be scanned to the display panel 210 based on the image data. A screen according to the scanned data voltage may be displayed on the display panel 210.

In an embodiment, the processor 120 and the display module 160 may be connected to each other through an interface. For example, the processor 120 and the display module 160 may be connected to each other through a mobile industry processor interface (MIPI). The interface may deliver a command. The processor 120 may transmit the image data to the DDI 230 through the interface. In various embodiments, the interface is not limited to the described example, and may be formed in various ways. For example, the interface may include a mobile display digital interface (MDDI), a serial peripheral interface (SPI), an inter-integrated circuit (I2C), or a compact display port (CDP).

In an embodiment, the image data may be supplied to the DDI 230 of the display module 160 through the interface for each frame (1 (one) frame). The length of one frame may be determined depending on the operating frequency of the DDI 230. The operating frequency may, for example, be the refresh rate of the DDI 230. The operating frequency and the length of one frame may have an inversely proportional relationship. For example, when the DDI 230 operates at the operating frequency of about 60 Hz, the length of one frame may be about 16.67 ms (millisecond). As another example, when the DDI 230 operates at the operating frequency of about 120 Hz, the length of one frame may be about 8.33 ms (millisecond).

In an embodiment, when a screen displayed on the display panel 210 corresponds to a still image, the processor 120 may enter a power saving state. The processor 120 does not continuously transmit image data to the DDI 230, thereby reducing power consumption.

In an embodiment, the DDI 230 may include a frame buffer 320. The frame buffer 320 may store image data during one frame. The DDI 230 may store image data transmitted by the processor 120 in the frame buffer 320. The DDI 230 may scan the image data stored in the frame buffer 320 during one frame to output a screen on the display panel 210.

Figure 4:
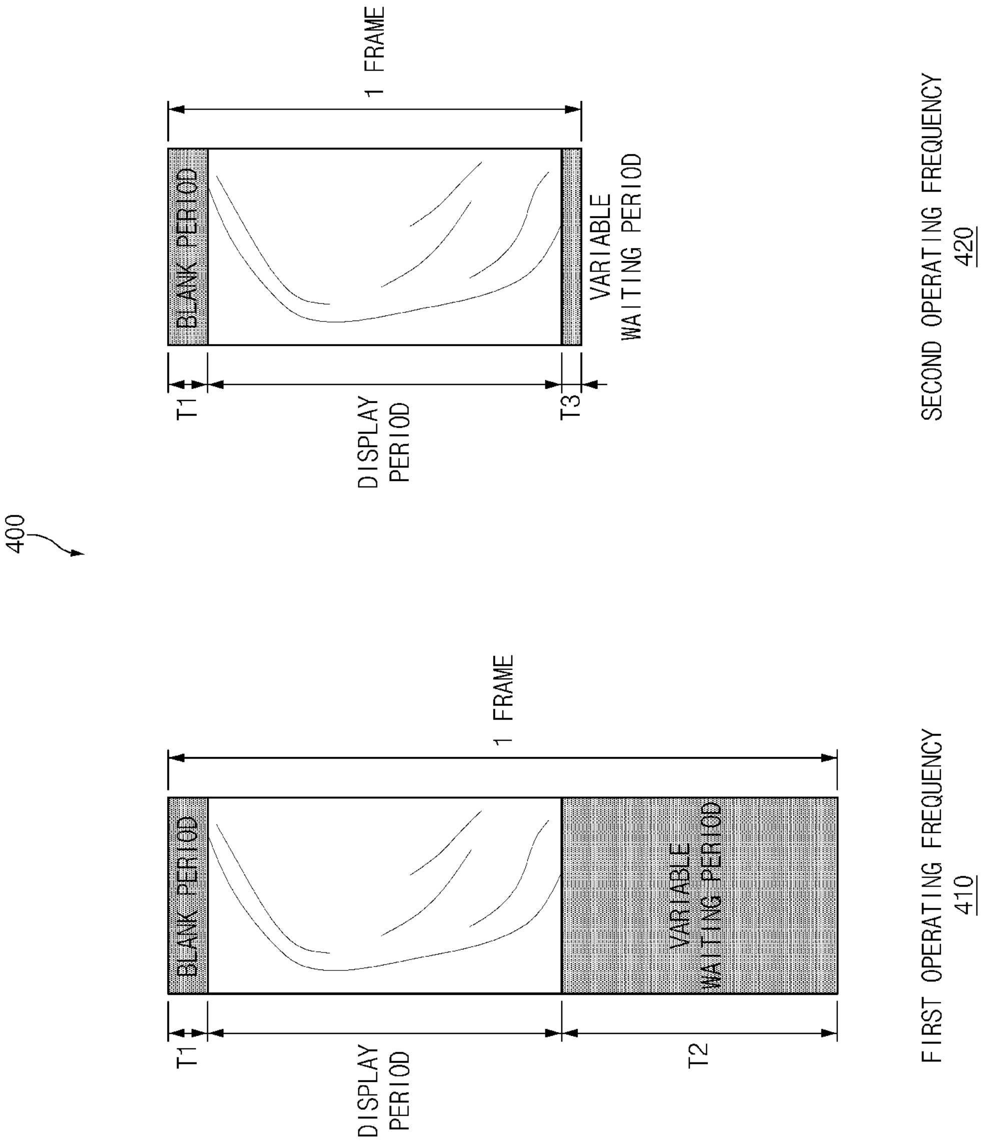
FIG. 4 is a diagram illustrating a blank period, a display period, and a variable waiting period of one frame, according to various embodiments.

In an embodiment, the DDI 230 may generate a synchronization signal. The synchronization signal may be a signal for controlling a time point at which a data voltage is supplied to the display panel 210. For example, the synchronization signal may be a TE signal for reducing a tearing effect (TE). The tearing effect may refer to a phenomenon in which an image is torn when an image of the current frame is scanned while an image of the previous frame remains. The DDI 230 may deliver the synchronization signal to the processor 120. The processor 120 may transmit image data to the DDI 230 based on the synchronization signal, thereby reduce a tearing effect FIG. 4 is a diagram 400 illustrating a blank period, a display period, and a variable waiting period of one frame, according to various embodiments.

In an embodiment, a length of one frame may, for example, be set depending on an operating frequency of a DDI (e.g., the DDI 230 in FIG. 3). As the operating frequency is high, the length of one frame may be shortened. When a second operating frequency 420 is higher than a first operating frequency 410, the length of one frame at the second operating frequency 420 may be shorter than the length of one frame at the first operating frequency 410. For example, when the first operating frequency 410 is about 60 Hz, the length of one frame may be about 16.67 ms (millisecond). When the second operating frequency 420 is about 120 Hz, the length of one frame may be about 8.33 ms (millisecond) shorter than the length of one frame of the first operating frequency 410. One frame may include a blank period, a display period, and a variable waiting period.

In an embodiment, the blank period may be a period in which buffering occurs in the DDI 230 before the display period is started within one frame. In the blank period, the display panel (e.g., the display panel 210 in FIG. 2) may not display a screen. The blank period may, for example, be a vertical back porch (VBP).

In an embodiment, the display period may be a period in which the DDI 230 scans a data voltage to the display panel 210 within one frame. In the display period, the display panel 210 may output the screen.

In an embodiment, the variable waiting period may be a period in which a processor (e.g., the processor 120 in FIG. 3) starts transmitting image data to the DDI 230 after the display period progresses within one frame. In the variable waiting period, the display panel 210 may not display the screen. The variable waiting period may, for example, be a vertical front porch (VFP).

In an embodiment, the length of the blank period may be a first length T1. The length of the blank period may, for example, be determined depending on the resolution of the display panel 210. For example, the length of the blank period may be determined depending on the number of pixel lines of the horizontal period of the display panel 210. The first length T1 may be independent of the operating frequency. Even when the operating frequency is changed, the first length T1 may be maintained as a constant value.

In an embodiment, a length of the display period may, for example, be determined depending on the resolution of the display panel 210. The length of the display period may be independent of the operating frequency. Even when the operating frequency is changed, the length of the display period may be maintained as a constant value.

In an embodiment, a length of the variable waiting period may vary. A length of the waiting period may vary depending on the resolution and/or operating frequency of the display panel 210.

In an embodiment, when the operating frequency increases, the length of the variable waiting period may decrease. At the first operating frequency 410, the length of the variable waiting period may be a second length T2. At the second operating frequency 420, the length of the variable waiting period may be a third length T3. When the second operating frequency 420 is higher than the first operating frequency 410, the third length T3 may be shorter than the second length T2. For example, when the first operating frequency 410 is about 60 Hz, the second length T2 may be about 6.75 ms (millisecond). When the second operating frequency 420 is about 120 Hz, the second length T2 may be about 0.04 ms (millisecond).

Figure 5:
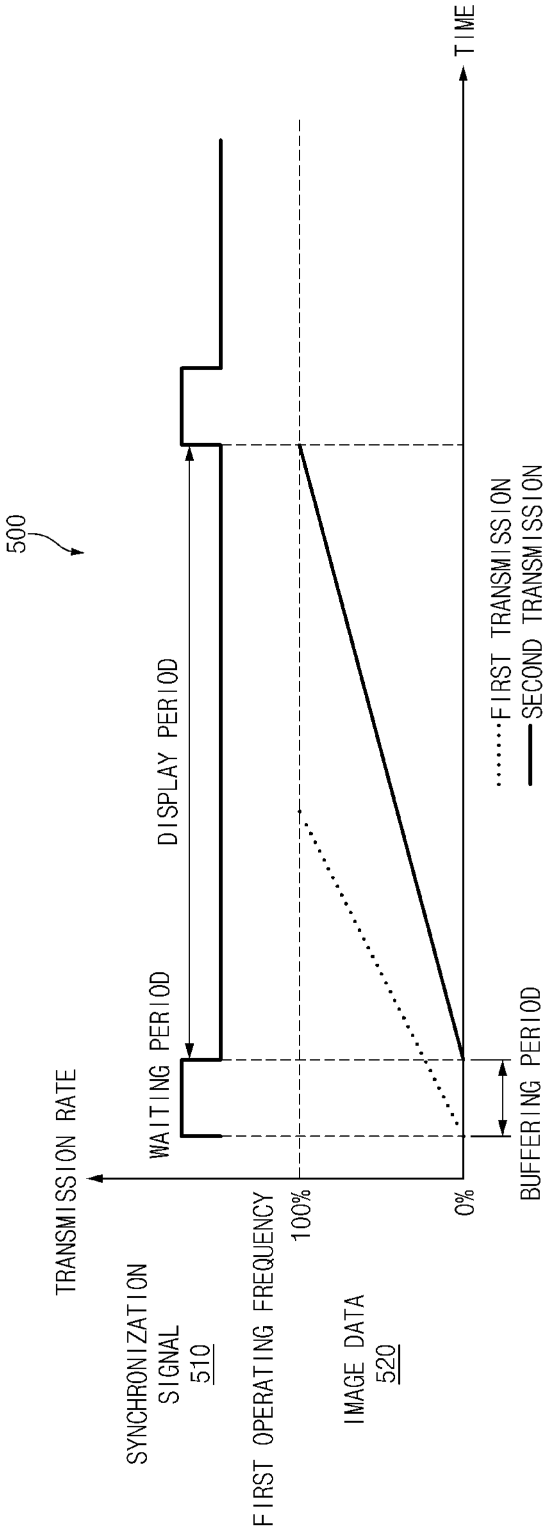
FIG. 5 is a graph illustrating transmission of a synchronization signal and image data at a first operating frequency, according to various embodiments.

FIG. 5 is a graph 500 illustrating transmission of a synchronization signal 510 and image data 520 at a first operating frequency, according to various embodiments.

In the graph 500 according to an embodiment, a horizontal axis may indicate time. One frame period may include one waiting period and one display period. In the graph 500 according to an embodiment, a vertical axis may indicate a transmission rate. The transmission rate may increase from 0% to 100% during one frame period. The transmission rate of first transmission may be a rate at which a processor (e.g., the processor 120 in FIG. 3) transmits image data through a DDI (e.g., the DDI 230 in FIG. 3). The transmission rate of second transmission may be a rate at which the DDI 230 scans a data voltage to a display panel (e.g., the display panel 210 in FIG. 2).

In an embodiment, the DDI 230 may operate at a first operating frequency. The first operating frequency may be about 120 Hz. The DDI 230 may generate the synchronization signal 510 corresponding to the first operating frequency. The synchronization signal 510 may include a waiting period and a display period. In the waiting period, the synchronization signal 510 may, for example, have a high (H) level. In the display period, the synchronization signal 510 may have a low (L) level. The synchronization signal 510 may have a rising time point at which the synchronization signal 510 is changed from a low level to a high level.

In an embodiment, the DDI 230 may supply a data voltage to the display panel 210 during the display period. The DDI 230 may complete supplying the data voltage to the display panel 210 at a time point when the display period ends. The DDI 230 may supply a data voltage to the display panel 210 based on the synchronization signal 510.

In an embodiment, the DDI 230 may control a time point, at which the image data 520 is received from the processor 120, by transmitting the synchronization signal 510 to a processor (e.g., the processor 120 in FIG. 3). The DDI 230 may transmit the synchronization signal 510 to the processor 120. The processor 120 may transmit the image data 520 to the DDI 230 based on the synchronization signal 510.

In an embodiment, the processor 120 may be configured to select a time point, at which the image data 520 starts to be transmitted, within the waiting period of the synchronization signal. The waiting period may, for example, be a buffering period for preparing to display a screen during the display period. The processor 120 may set a time point at which the image data 520 starts to be transmitted to the DDI 230 within the waiting period. The processor 120 may wait for rendering of the next frame within a period in which the synchronization signal 510 has a high level. The processor 120 may start transmitting the image data 520 after the rising time point of the synchronization signal 510.

In an embodiment, the waiting period may include a blank period (e.g., the blank period in FIG. 4) and a variable waiting period (e.g., the variable waiting period in FIG. 4). The processor 120 may be configured to select a time point at which to start transmitting the image data 520 within a variable waiting period. The variable waiting period may, for example, be a period in which a TE signal has a high level. The processor 120 may wait for rendering of the next frame within a period in which the TE signal has a high level. The processor 120 may start transmitting the image data 520 after the rising time point of the TE signal.

In an embodiment, the processor 120 may perform the first transmission of the image data 520 to the DDI 230. The DDI 230 may perform the second transmission of supplying a data voltage to the display panel 210. The duration of the first transmission may be shorter than that of the second transmission. The speed at which the first transmission occurs may be faster than the speed at which the second transmission occurs. The processor 120 may select a time point, at which the first transmission starts, within the waiting period by using a speed difference between the first transmission and the second transmission.

In an embodiment, the processor 120 may additionally allocate a rendering time of a graphics processing unit (e.g., the graphics processing unit 310 in FIG. 3) as much as the waiting time after a vertical signal is output during the waiting period. When the rendering time of the graphics processing unit 310 is allocated as much as the waiting time after vertical signal is output, a frame drop phenomenon may be reduced. The frame drop phenomenon may refer to a phenomenon in which a screen corresponding to image data of a previous frame is maintained because the image data 520 is not delivered during the corresponding frame. The processor 120 may transmit the image data 520 to the DDI 230 during the waiting time after the vertical signal is output, thereby reducing the frame drop phenomenon.

Figure 6:
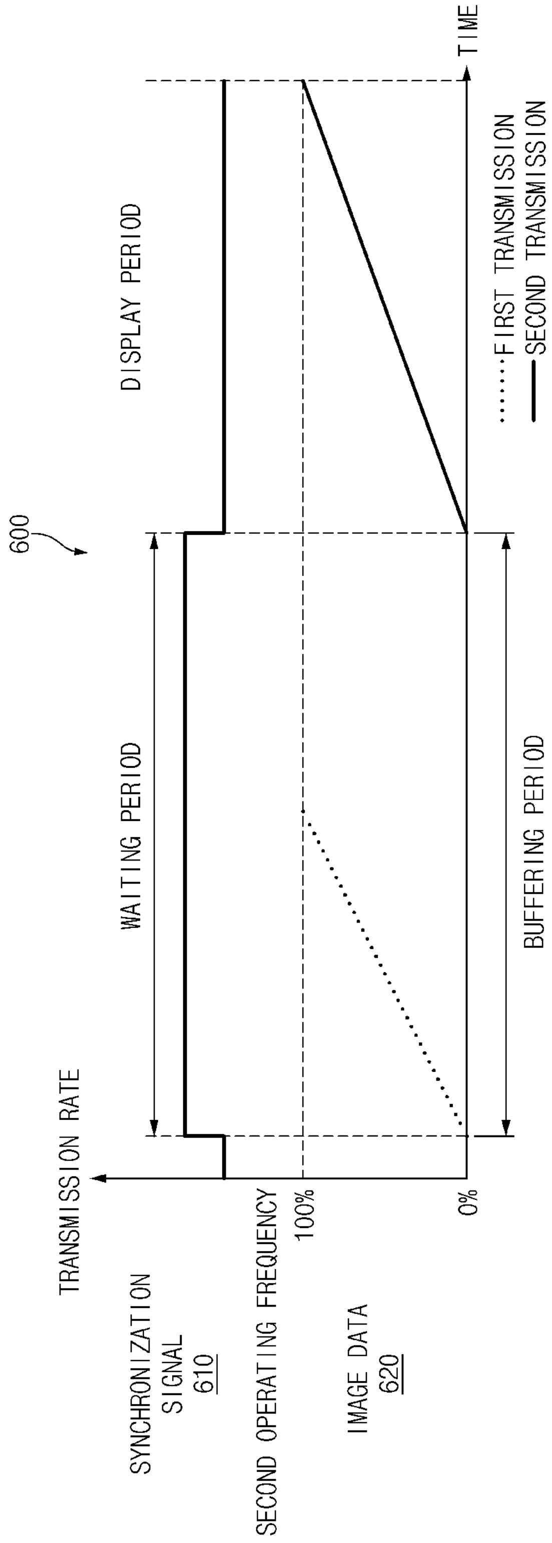
FIG. 6 is a graph illustrating transmission of a synchronization signal and image data at a second operating frequency, according to various embodiments.

FIG. 6 is a graph 600 illustrating transmission of a synchronization signal 610 and image data 620 at a second operating frequency, according to various embodiments.

In an embodiment, a second operating frequency may be different from a first operating frequency. The second operating frequency may be a frequency lower than the first operating frequency. For example, when the first operating frequency is about 120 Hz, the second operating frequency may be about 60 Hz.

In an embodiment, when an operating frequency decreases, a length of a waiting period may be increased. When the operating frequency decreases, a length of a variable waiting period may increase during the waiting period. When the operating frequency decreases, the length of the buffering period may be increased.

In an embodiment, a processor (e.g., the processor 120 in FIG. 3) may set the operating frequency of a DDI (e.g., the DDI 230 in FIG. 3) based on the length of the waiting period. The processor 120 may supply the image data 620 to the DDI 230 based on the length of the waiting period. While the synchronization signal 610 is at a high level, the processor 120 may start supplying the image data 620 to the DDI 230. The processor 120 may implement adaptive synchronization by utilizing a period during which the TE signal is at a high level, that is, the waiting time after a vertical signal is output. The processor 120 may operate the waiting time of a frame buffer (e.g., the frame buffer 320 of FIG. 3) in conjunction with the waiting time after the vertical signal is output.

In an embodiment, the processor 120 may be configured to determine pixel characteristic values included in the image data 620 based on the operating frequency. The pixel characteristic values may be values set for pixels included in a display panel (e.g., the display panel 210 in FIG. 2) to represent an image. For example, the pixel characteristic values may include, for example, a gamma characteristic value, a color ratio value, or an emission timing value.

In an embodiment, when the display panel 210 operates in an organic light emitting diode (OLED) scheme, the pixel characteristic values may be determined at the start time point of the frame. When the length of the current frame increases because the start of the next frame is delayed in a case in which a time point at which transmission of the image data 620 starts is fixed to a specific time point such as the start time point of the waiting period, the operating frequency of the current frame may be changed. The processor 120 disclosed in this disclosure may adjust the transmission start time point of the image data 620 within the waiting period. Accordingly, even when the start of the next frame is delayed, the processor 120 may maintain the operating frequency of the current frame.

Figure 7:
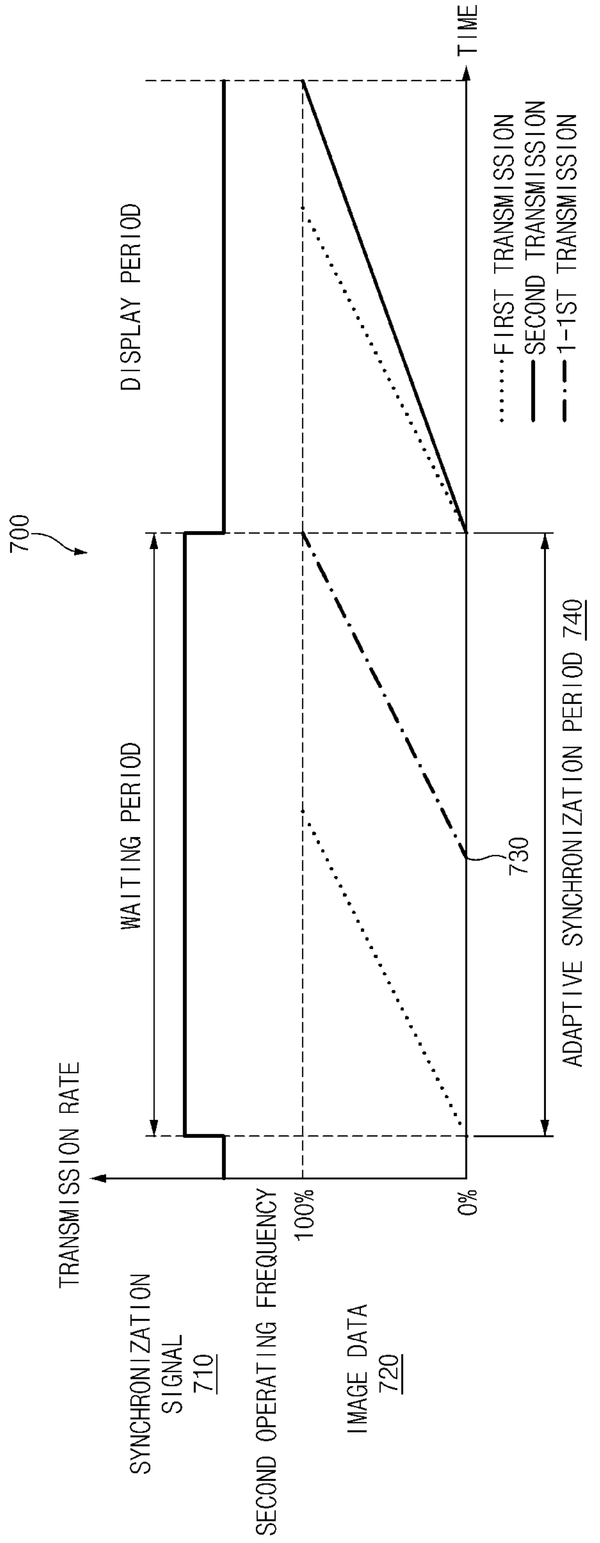
FIG. 7 is a graph illustrating setting transmission time points of a synchronization signal and image data at a second operating frequency, according to various embodiments.

FIG. 7 is a graph 700 illustrating setting transmission time points of the synchronization signal 710 and the image data 720 at a second operating frequency, according to various embodiments.

In an embodiment, a DDI (e.g., the DDI 230 in FIG. 3) may deliver the synchronization signal 710 to a processor (e.g., the processor 120 in FIG. 3). The processor 120 may determine a time point of a waiting period, in which the synchronization signal 710 is at a high level, as a first time point 730 at which transmission of the image data 720 starts. For example, the processor 120 may start 1-1st transmission at the first time point 730. Through the 1-1st transmission, the processor 120 may transmit the image data 720 to the DDI 230. Except that a time point at which transmission starts is adjusted to the first time point 730, the 1-1st transmission may proceed to be substantially the same as the first transmission.

In an embodiment, the processor 120 may set the waiting period as an adaptive synchronization period 740. The processor 120 may transmit the image data 720 to the DDI 230 within the adaptive synchronization period 740.

In an embodiment, while keeping a length of the display period substantially the same within one frame, the processor 120 may change the operating frequency. The processor 120 may change the operating frequency by adjusting a time point, at which the image data 720 is transmitted to the DDI 230, within the adaptive synchronization period 740. The processor 120 may reduce an operating frequency by delaying a time point at which the image data 720 is transmitted to the DDI 230. For example, when driving a display panel (e.g., the display panel 210 in FIG. 2) for supporting an operating frequency of about 120 Hz at an operating frequency of about 60 Hz, the processor 120 may additionally secure the adaptive synchronization period 720 of about 8 ms (millisecond). The processor 120 may operate while adaptively changing the operating frequency from about 60 Hz to about 41 Hz. As another example, when driving the display panel 210 for supporting an operating frequency of about 120 Hz at an operating frequency of about 96 Hz, the processor 120 may additionally secure the adaptive synchronization period 720 of about 2 ms (millisecond). The processor 120 may operate while adaptively changing the operating frequency from about 96 Hz to about 80 Hz.

Figure 8:
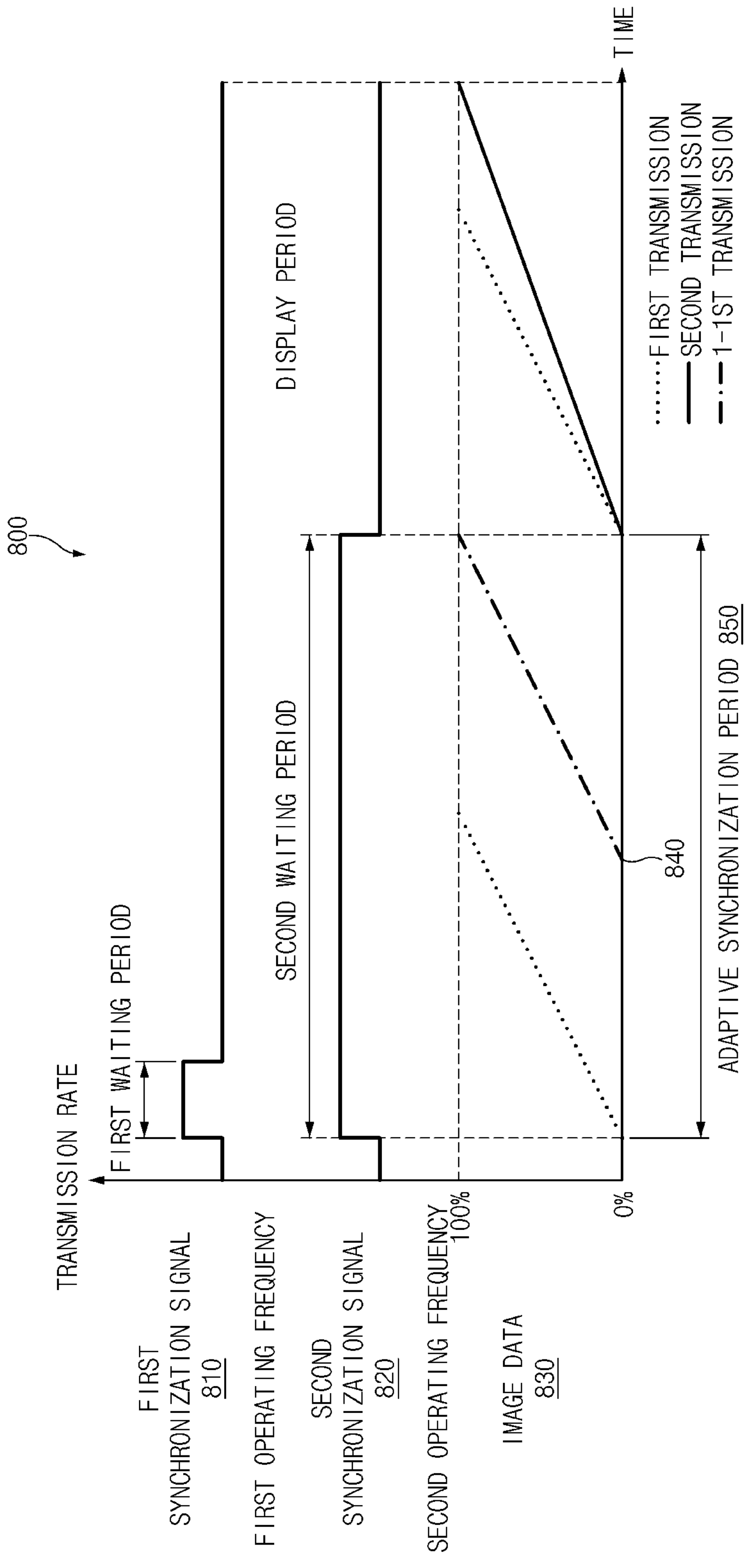
FIG. 8 is a graph illustrating setting transmission time points of a first synchronization signal, a second synchronization signal, and image data, according to various embodiments.

FIG. 8 is a graph 800 illustrating setting transmission time points of a first synchronization signal 810, a second synchronization signal 820, and image data 830, according to an embodiment.

In an embodiment, a DDI (e.g., the DDI 230 in FIG. 3) may divide a synchronization signal (e.g., the synchronization signal 710 at the second operating frequency of FIG. 7) into a first synchronization signal 810 delivered to a processor (e.g., the processor 120 in FIG. 3), and a second synchronization signal 820 used inside the DDI 230. The DDI 230 may deliver the first synchronization signal 810 to the processor 120. The DDI 230 may internally utilize the second synchronization signal 820.

In an embodiment, the DDI 230 may set a length of a second waiting period, which is a waiting period of the second synchronization signal 820, to be longer than a length of a first waiting period, which is a waiting period of the first synchronization signal 810. The DDI 230 may set the length of the waiting period of the second synchronization signal 820 used to supply a data voltage to a display panel (e.g., the display panel 210 in FIG. 2) to be long.

In an embodiment, the DDI 230 may start supplying the data voltage to the display panel 210 at the time point at which the second waiting period ends. The DDI 230 may supply the data voltage to the display panel 210 during a display period defined by the second synchronization signal 820.

In an embodiment, the processor 120 may be configured to select a time point 840, at which transmission of the image data 830 starts, within an adaptive synchronization period 850 defined by a second waiting period. The processor 120 may start 1-1st transmission at the time point 840 selected within the adaptive synchronization period 850. Through the 1-1st transmission, the processor 120 may transmit the image data 830 to the DDI 230. Except that a time point at which transmission starts is adjusted to the selected time point 840, the 1-1st transmission may proceed to be substantially the same as the first transmission.

Figure 9:
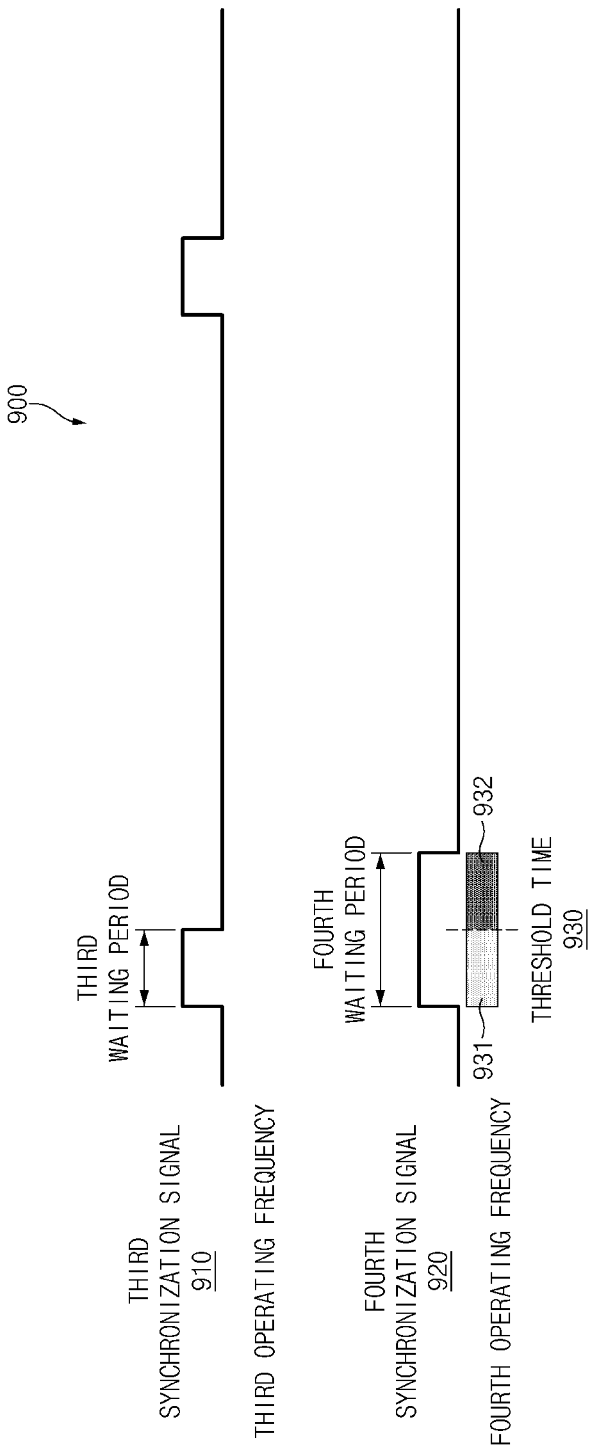
FIG. 9 is a graph illustrating setting an operating frequency depending on a transmission time point of synchronization signals and image data according to an operating frequency, according to various embodiments.

FIG. 9 is a graph 900 illustrating setting an operating frequency depending on a transmission time point of synchronization signals 910 and 920 and image data according to an operating frequency, according to various embodiments.

In an embodiment, when operating at a third operating frequency, a DDI (e.g., the DDI 230 in FIG. 3) may generate a third synchronization signal 910. The third synchronization signal 910 may have a third waiting time. When operating at a fourth operating frequency, the DDI 230 may generate a fourth synchronization signal 920. The fourth operating frequency may be smaller than the third operating frequency. For example, the third operating frequency may be about 120 Hz, and the fourth operating frequency may be about 96 Hz. The fourth synchronization signal 920 may have a fourth waiting time. A length of the fourth waiting time may be longer than a length of the third waiting time.

In an embodiment, a processor (e.g., the processor 120 in FIG. 3) may specify a threshold time 930 within a waiting period. For example, the threshold time 930 may be a time point at which about 50% of the time has elapsed in one waiting period. The threshold time 930 may be a time to secure a buffer time between a time point at which the processor 120 starts transmitting image data and a time point at which the DDI 230 starts supplying a data voltage.

In an embodiment, the waiting period may include a first period 931, which is a period before the threshold time 930, and a second period 932, which is a period after the threshold time 930.

In an embodiment, the processor 120 may be configured to deliver a first command to decrease an operating frequency to the DDI 230 in response to a time point at which image data starts to be transmitted being a time point after the threshold time 930. When the time point at which image data transmission starts is included within the second period 932, the processor 120 may trigger the first command to decrease the operating frequency. The processor 120 may transmit a first command to control the DDI 230 to the DDI 230 so as to operate at a low operating frequency among multiple operating frequencies, at each of which the DDI 230 operates. For example, when the DDI 230 is capable of operating at four operating frequencies such as 120 Hz, 96 Hz, 80 Hz, and 60 Hz, and when a time point at which image data starts to be transmitted is within the second period 932 while the DDI 230 operates at an operating frequency of 120 Hz, the processor 120 may deliver the first command to decrease the operating frequency from 120 Hz to 96 Hz to the DDI 230. The processor 120 may allow the DDI 230 to reduce a frame drop by securing a buffer time between a time point at which image data transmission starts and a time point at which data voltage starts to be supplied by the DDI 230.

In an embodiment, the processor 120 may be configured to deliver a second command to increase an operating frequency to the DDI 230 in response to a time point at which image data starts to be transmitted being a time point before the threshold time 930. When the time point at which image data transmission starts is included within the first period 931, the processor 120 may trigger the second command to increase the operating frequency. For example, when the DDI 230 is capable of operating at four operating frequencies such as 120 Hz, 96 Hz, 80 Hz, and 60 Hz, and when a time point at which image data starts to be transmitted is within the first period 931 while the DDI 230 operates at an operating frequency of 96 Hz, the processor 120 may deliver the second command to increase the operating frequency from 96 Hz to 120 Hz to the DDI 230. When a sufficient buffer time is secured between a time point at which image data transmission starts and a time point at which the DDI 230 starts supplying a data voltage, the processor 120 may allow the DDI 230 to restore an operating frequency to be in an original operating state.

According to various example embodiments, an electronic device (e.g., the electronic device 101 of FIG. 1) may include a display panel (e.g., the display panel 210 of FIG. 2) that displays a screen, a display driver IC (DDI) (e.g., the DDI 230 of FIG. 3) that supplies a data voltage for displaying the screen to the display panel 210, and a processor (e.g., the processor 120 of FIG. 3) that transmits image data for setting the data voltage to the DDI 230. The DDI 230 may be configured to generate a synchronization signal (e.g., the synchronization signal 710 of FIG. 7) for controlling a time point at which the data voltage is supplied to the display panel 210, and to deliver the synchronization signal 710 to the processor 120. The processor 120 may be configured to select a time point (e.g., the first time point 730 of FIG. 7), at which the image data starts to be transmitted, within a waiting period of the synchronization signal 710.

In an example embodiment, the waiting period may include a blank period and a variable waiting period. The processor 120 may be configured to select the time point within the variable waiting period.

In an example embodiment, the DDI 230 may include a frame buffer (e.g., the frame buffer 320 of FIG. 3) for storing the image data during 1 frame. The DDI 230 may be configured to supply, to the display panel 210, the data voltage based on the image data stored in the frame buffer 320 during a display period of the synchronization signal.

In an example embodiment, the processor 120 may perform a first transmission for transmitting the image data to the DDI 230. The DDI 230 may perform a second transmission for supplying the data voltage to the display panel 210. A duration of the first transmission may be shorter than a duration of the second transmission.

In an example embodiment, the processor 120 may be configured to set an operating frequency of the DDI 230 based on a length of the waiting period, and to determine pixel characteristic values included in the image data based on the operating frequency.

In an example embodiment, the DDI 230 may be configured to divide the synchronization signal 710 into a first synchronization signal (e.g., the first synchronization signal 810 of FIG. 8) delivered to the processor 120, and a second synchronization signal (e.g., the second synchronization signal 820 of FIG. 8) used inside the DDI 230, to set a length of a second waiting period, which is a waiting period of the second synchronization signal 820, to be longer than a length of a first waiting period, which is a waiting period of the first synchronization signal 810, and to start supplying the data voltage to the display panel 210 at a time point at which the second waiting period ends. The processor 120 may be configured to select the time point (e.g., the time point 840 of FIG. 8), at which the image data starts to be transmitted, within an adaptive synchronization period (e.g., the adaptive synchronization period 850 of FIG. 8) defined by the second waiting period.

In an embodiment, the processor 120 may be configured to assign a threshold time (e.g., the threshold time 930 of FIG. 9) within the waiting period, and to deliver a first command to decrease the operating frequency to the DDI 230 in response to the time point at which the image data starts to be transmitted being a time point after the threshold time 930.

In an example embodiment, the processor 120 may be configured to deliver a second command to increase an operating frequency to the DDI 230 in response to a time point at which image data starts to be transmitted being a time point before the threshold time 930.

Moreover, according an example embodiment, a method for controlling an electronic device (e.g., electronic device 101) may include generating, by a DDI (e.g., DDI 230) of the electronic device 101, a synchronization signal (e.g., synchronization signal 710) for controlling a time point at which the data voltage is supplied to a display panel (e.g., display panel 210) of the electronic device 101, delivering, by the DDI 230, the synchronization signal 710 to a processor (e.g., processor 120) of the electronic device 101, and selecting, by the processor 120, a time point, at which the image data starts to be transmitted to the DDI 230, within a waiting period of the synchronization signal 710.

Furthermore, according an example embodiment disclosed in the specification, a non-transitory computer-readable non-transitory recording medium stores a plurality of instructions. The plurality of instructions may cause a DDI (e.g., DDI 230) of an electronic device (e.g., electronic device 101) to generate a synchronization signal (e.g., synchronization signal 710) for controlling a time point at which a data voltage is supplied to a display panel (e.g., display panel 210) of the electronic device 101, may allow the DDI 230 to deliver the synchronization signal 710 to the processor 120 of the electronic device 101, and may allow the processor 120 to select a time point, at which the image data starts to be transmitted to the DDI 230, within a waiting period of the synchronization signal 710.

The electronic device according to various example embodiments disclosed in the disclosure may be various types of devices. The electronic device may include, for example, a portable communication device (e.g., a smartphone), a computer device, a portable multimedia device, a mobile medical appliance, a camera, a wearable device, a home appliance, or the like. An electronic device according to an example embodiment may not be limited to the above-described electronic devices.

Various embodiments of the disclosure and terms used herein are not intended to limit the technical features described in the disclosure to specific embodiments, and it should be understood that the example embodiments and the terms include modifications, equivalents, or alternatives of the corresponding embodiments described herein. With regard to description of drawings, similar or related components may be identified by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", a component is connectable to the other component, directly (e.g., by wire), wirelessly, or through the third component.

In various embodiments of the disclosure, the term "module" used herein may include a unit, which is implemented with hardware, software, or firmware, or any combination thereof, and may be interchangeably used with the terms "logic", "logical block", "part", or "circuit". The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the disclosure may be implemented with software (e.g., program 140) including one or more instructions stored in a storage medium (e.g., the embedded memory 136 or the external memory 138) readable by a machine (e.g., the electronic device 101). For example, the processor (e.g., the processor 120) of the machine (e.g., the electronic device 101) may call at least one instruction of the stored one or more instructions from a storage medium and then may execute the at least one instruction. This enables the machine to operate to perform at least one function depending on the called at least one instruction. The one or more instructions may include a code generated by a compiler or a code executable by an interpreter. The machine-readable storage medium may be provided in the form of a non-transitory storage medium, where 'non-transitory' simply refers to the storage medium being a tangible device and does not include a signal (e.g., electromagnetic waves), and this term does not distinguish between the case in which data is semipermanently stored in the storage medium and the case in which the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to various embodiments, each component (e.g., a module or a program) of the above-described components may include a single entity or a plurality of entities, and some of the plurality of objects may be separately arranged on other components. According to various embodiments, one or more components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, programs, or other components may be executed by a successive method, a parallel method, a repeated method, or a heuristic method. Alternatively, at least one or more of the operations may be executed in another order or may be omitted, or one or more operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a display configured to display a screen;

a display driver IC (DDI) configured to supply a data voltage for displaying the screen to the display; and at least one processor, comprising processing circuitry, configured to transmit image data for setting the data voltage to the DDI, wherein the DDI is configured to:

generate a synchronization signal for controlling a time point at which the data voltage is supplied to the display; and deliver the synchronization signal to the at least one processor, and wherein the at least one processor is configured, individually or collectively, to:

select a time point, at which the image data starts to be transmitted, within a waiting period of the synchronization signal in a frame period set depending on an operating frequency of the electronic device;

assign a threshold time within the waiting period; and send a command to the DDI to change the operating frequency based on whether the time point at which the image data starts to be transmitted is before or after the threshold time.

2. The electronic device of claim 1, wherein the waiting period includes a blank period, during which buffering occurs in the DDI before a display period in which the screen is displayed within one frame is started, and a variable waiting period, during which the at least one processor starts transmitting the image data to the DDI after the display period progresses, and wherein the at least one processor is configured to:

select the time point, at which the image data starts to be transmitted to the DDI, to be within the variable waiting period.

3. The electronic device of claim 1, wherein the DDI includes a frame buffer configured to store the image data during one frame, and wherein the DDI is configured to:

supply, to the display, the data voltage based on the image data stored in the frame buffer during a display period of the synchronization signal.

4. The electronic device of claim 1, wherein the at least one processor is configured to perform a first transmission for transmitting the image data to the DDI, wherein the DDI is configured to perform a second transmission for supplying the data voltage to the display, and wherein a duration of the first transmission is shorter than a duration of the second transmission.

5. The electronic device of claim 1, wherein the at least one processor is configured to:

set an operating frequency of the DDI based on a length of the waiting period; and determine pixel characteristic values included in the image data based on the operating frequency of the DDI.

6. The electronic device of claim 1, wherein the DDI is configured to:

divide the synchronization signal into a first synchronization signal delivered to the at least one processor, and a second synchronization signal used inside the DDI;

set a length of a second waiting period, which is a waiting period of the second synchronization signal, to be longer than a length of a first waiting period, which is a waiting period of the first synchronization signal; and start supplying the data voltage to the display at a time point at which the second waiting period ends, and wherein the at least one processor is configured to:

select the time point, at which the image data starts to be transmitted to the DDI, within an adaptive synchronization period defined by the second waiting period.

7. The electronic device of claim 1, wherein the at least one processor is configured to:

send a first command to the DDI to decrease the operating frequency based on the time point at which the image data starts to be transmitted being a time point after the threshold time.

8. The electronic device of claim 7, wherein the at least one processor is configured to:

deliver a second command to the DDI to increase the operating frequency based on the time point at which the image data starts to be transmitted being a time point before the threshold time.

9. A method for controlling an electronic device, the method comprising:

generating, by a DDI of the electronic device, a synchronization signal for controlling a time point at which a data voltage is supplied to a display panel of the electronic device;

delivering, by the DDI, the synchronization signal to at least one processor of the electronic device;

selecting, by the processor, a time point, at which image data starts to be transmitted to the DDI, within a waiting period of the synchronization signal in a frame period set depending on an operating frequency of the electronic device;

assigning a threshold time within the waiting period; and send a command to the DDI to change the operating frequency based on whether the time point at which the image data starts to be transmitted is before or after the threshold time.

10. The method of claim 9, wherein the waiting period includes a blank period, during which buffering occurs in the DDI before a display period in which a screen is displayed within one frame is started, and a variable waiting period, during which the processor starts transmitting the image data to the DDI after the display period progresses, and wherein the method comprises selecting the time point, at which the image data starts to be transmitted to the DDI, within the variable waiting period.

11. The method of claim 9, wherein the DDI includes a frame buffer configured to store the image data during one frame, and wherein the method comprises supplying, to the display, the data voltage based on the image data stored in the frame buffer during a display period of the synchronization signal.

12. The method of claim 9, comprising:

performing a first transmission for transmitting the image data to the DDI, and performing a second transmission for supplying the data voltage to the display panel, wherein a duration of the first transmission is shorter than a duration of the second transmission.

13. The method of claim 9, further comprising:

setting, by the at least one processor, an operating frequency of the DDI based on a length of the waiting period; and determining, by the at least one processor, pixel characteristic values included in the image data based on the operating frequency of the DDI.

14. The method of claim 9, further comprising:

dividing, by the DDI, the synchronization signal into a first synchronization signal delivered to the at least one processor, and a second synchronization signal used inside the DDI;

setting, by the DDI, a length of a second waiting period, which is a waiting period of the second synchronization signal, to be longer than a length of a first waiting period, which is a waiting period of the first synchronization signal;

starting, by the DDI, supplying the data voltage to the display panel at a time point at which the second waiting period ends; and selecting the time point, at which the image data starts to be transmitted to the DDI, within an adaptive synchronization period defined by the second waiting period.

15. The method of claim 9, further comprising:

sending, by the at least one processor, a first command to the DDI to decrease the operating frequency based on the time point at which the image data starts to be transmitted being a time point after the threshold time.

16. The method of claim 15, further comprising:

sending, by the at least one processor, a second command to the DDI to increase the operating frequency based on the time point at which the image data starts to be transmitted being a time point before the threshold time.

* * * * *